US008412529B2

United States Patent
McKee et al.

(10) Patent No.: US 8,412,529 B2
(45) Date of Patent: Apr. 2, 2013

(54) METHOD AND SYSTEM FOR ENHANCING VERBAL COMMUNICATION SESSIONS

(75) Inventors: Martin W. McKee, Herndon, VA (US); Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1190 days.

(21) Appl. No.: 12/260,158

(22) Filed: Oct. 29, 2008

(65) Prior Publication Data

US 2010/0106500 A1   Apr. 29, 2010

(51) Int. Cl.
*G10L 21/00* (2006.01)
(52) U.S. Cl. ........ 704/270; 704/260; 704/266; 704/258; 379/93.21; 379/93.17; 709/219; 434/319; 434/112
(58) Field of Classification Search .................. 704/275, 704/260, 266, 267, 258, 270; 379/93.21, 379/93.17; 434/319, 112; 715/151; 709/219; 706/45
See application file for complete search history.

(56) References Cited

U.S. PATENT DOCUMENTS

| | | | | |
|---|---|---|---|---|
| 4,334,248 A * | 6/1982 | Maiocco | ......................... | 360/12 |
| 5,231,670 A * | 7/1993 | Goldhor et al. | ............... | 704/275 |
| 6,912,517 B2 * | 6/2005 | Agnihotri et al. | ............... | 706/45 |
| 7,760,905 B2 * | 7/2010 | Rhoads et al. | ............... | 382/100 |
| 8,160,304 B2 * | 4/2012 | Rhoads et al. | ................ | 382/107 |
| 2003/0101150 A1 * | 5/2003 | Agnihotri et al. | ............... | 706/45 |
| 2004/0181340 A1 * | 9/2004 | Smith | ............... | 702/3 |
| 2005/0086004 A1 * | 4/2005 | Smith | ............... | 702/3 |
| 2006/0241865 A1 * | 10/2006 | Smith | ............... | 702/3 |
| 2007/0276928 A1 * | 11/2007 | Rhoads et al. | ............... | 709/219 |
| 2008/0313697 A1 * | 12/2008 | Rajan et al. | .................. | 725/151 |
| 2009/0045951 A1 * | 2/2009 | Rajan et al. | .................. | 340/540 |
| 2011/0145102 A1 * | 6/2011 | King et al. | ................... | 705/27.1 |

* cited by examiner

*Primary Examiner* — Vijay B Chawan

(57) ABSTRACT

An approach is provided for enhancing verbal communication sessions. A verbal component of a communication session is converted into textual information. The converted textual information is scanned for a text string to trigger an application. The application is invoked to provide supplemental information about the textual information or to perform an action in response to the textual information for or on behalf of a party of the communication session. The supplemental information or a confirmation of the action is transmitted to the party.

22 Claims, 14 Drawing Sheets

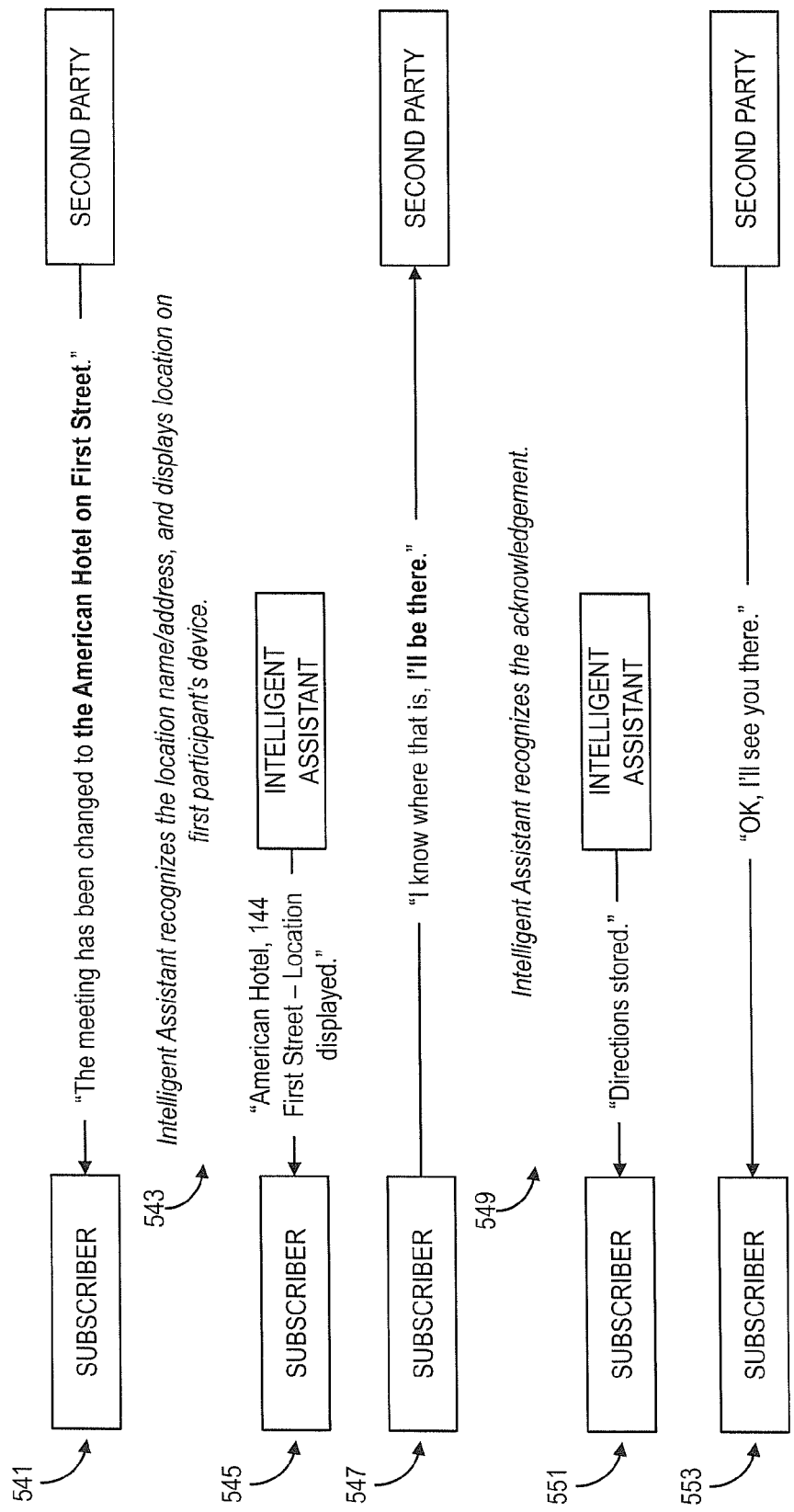

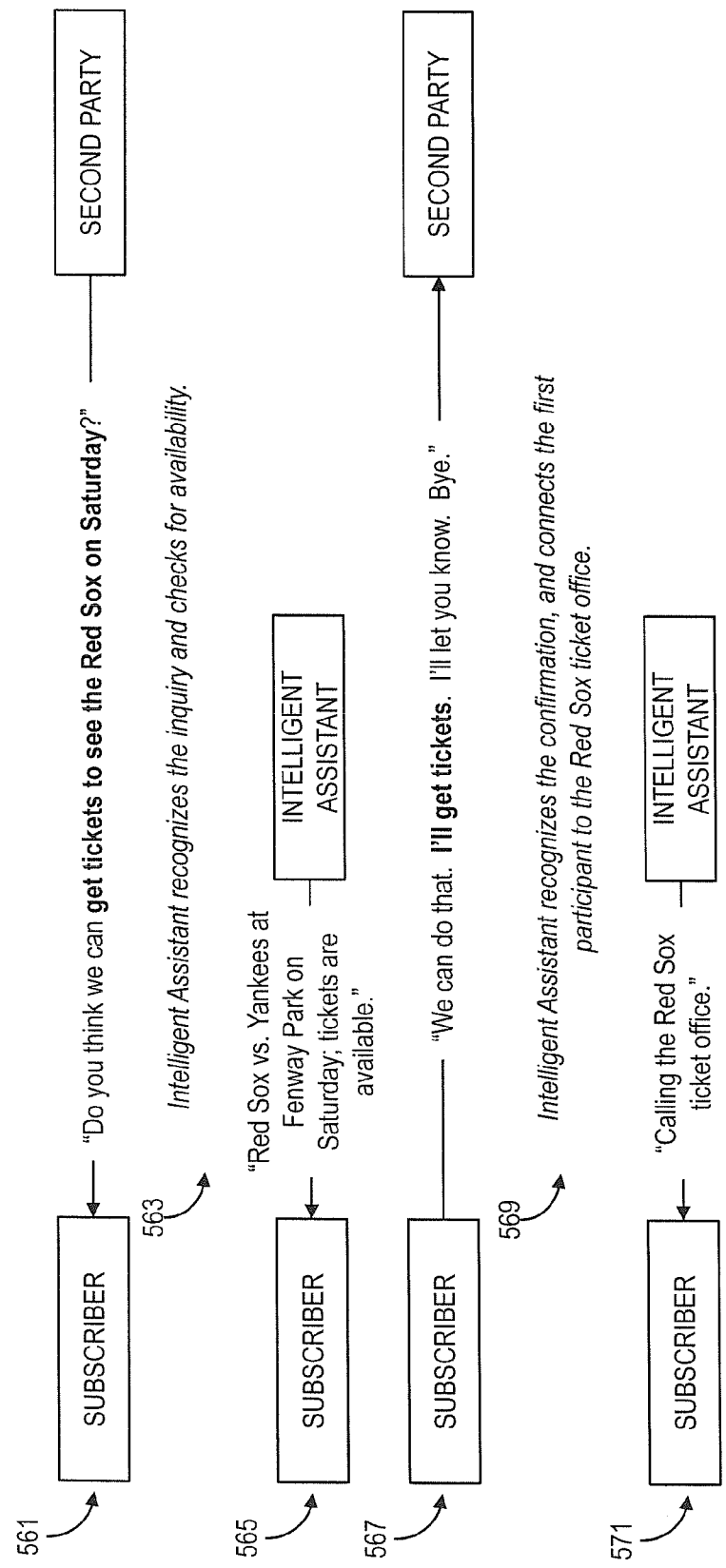

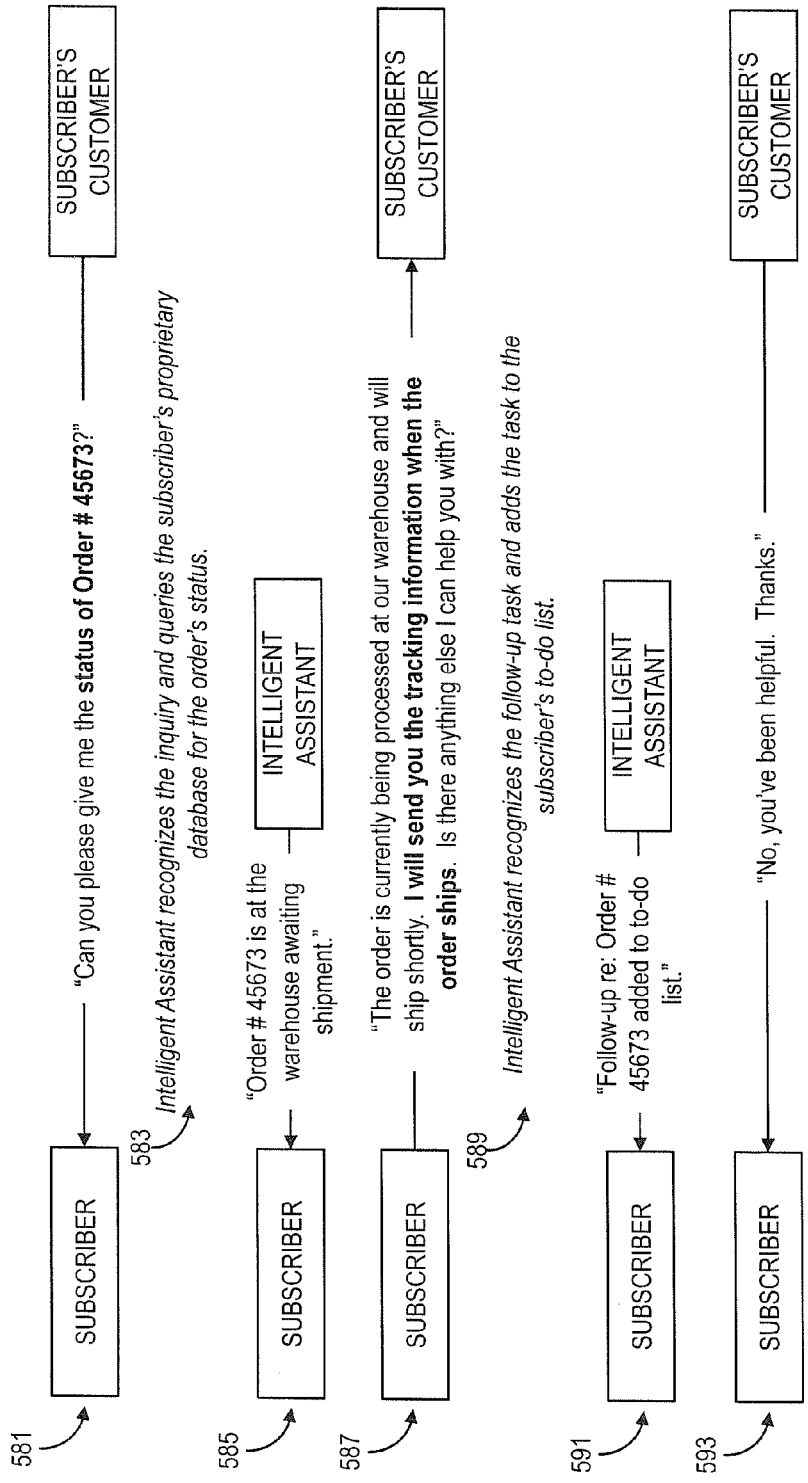

METHOD AND SYSTEM FOR ENHANCING VERBAL COMMUNICATION SESSIONS

BACKGROUND INFORMATION

Communications today, especially in business, is usually entwined with the activity of referencing or updating various types of online data. Depending on the nature of the communication, different information sources or actions may be used to supplement the conversation. For example, in a conversation about investments, parties may reference stock prices or market updates. Other conversations may involve checking a person's availability via a calendar application, committing events to a calendar, or checking weather forecasts. The range of information sources and actions available to supplement a conversation is potentially limitless. However, it is often not easy or practical to recall or access the full range of available resources during a conversation. This problem is particularly acute when a party is engaged in a real-time verbal communication session such as a telephone call. In many cases, the party may not have the time or resources, or may be concurrently engaged in an activity (e.g., driving) that prevents the party from accessing the supplemental information or action. As a result, the party may have to access the information or complete an action related to the conversation at a later time and then follow up with the other participant(s) of the telephone call after the call has ended.

In parallel, communications service providers are continually challenged to develop new services and features to remain competitive and to develop new sources of revenue.

Therefore, there is a need for an approach that provides for automated and seamless retrieval of supplemental information and/or initiation of a related action during a verbal communication session, while creating a new source of revenue for communication service providers.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 5A-5F, respectively, are diagrams illustrating scenarios for using an IA service to (1) check availability and update a calendar, (2) check availability and obtain a weather forecast, (3) obtain a stock quote, (4) obtain location information, (5) initiate another communication session, and (6) respond to a customer service inquiry, according to various embodiments;

DESCRIPTION OF THE PREFERRED EMBODIMENT

A preferred apparatus, method, and system for providing enhanced verbal communications using supplemental information and actions are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a multimedia device, it is contemplated that these embodiments have applicability to any device capable of communicating over a network, such as a wireless application protocol (WAP) enabled cellular telephone, a home communication terminal (HCT), a digital home communication terminal (DHCT), landline connected to a Public Switched Telephone Network (PSTN), a personal digital assistant (PDA), a television, and/or a personal computer (PC), as well as other like technologies and customer premises equipment (CPE).

Figure 1:
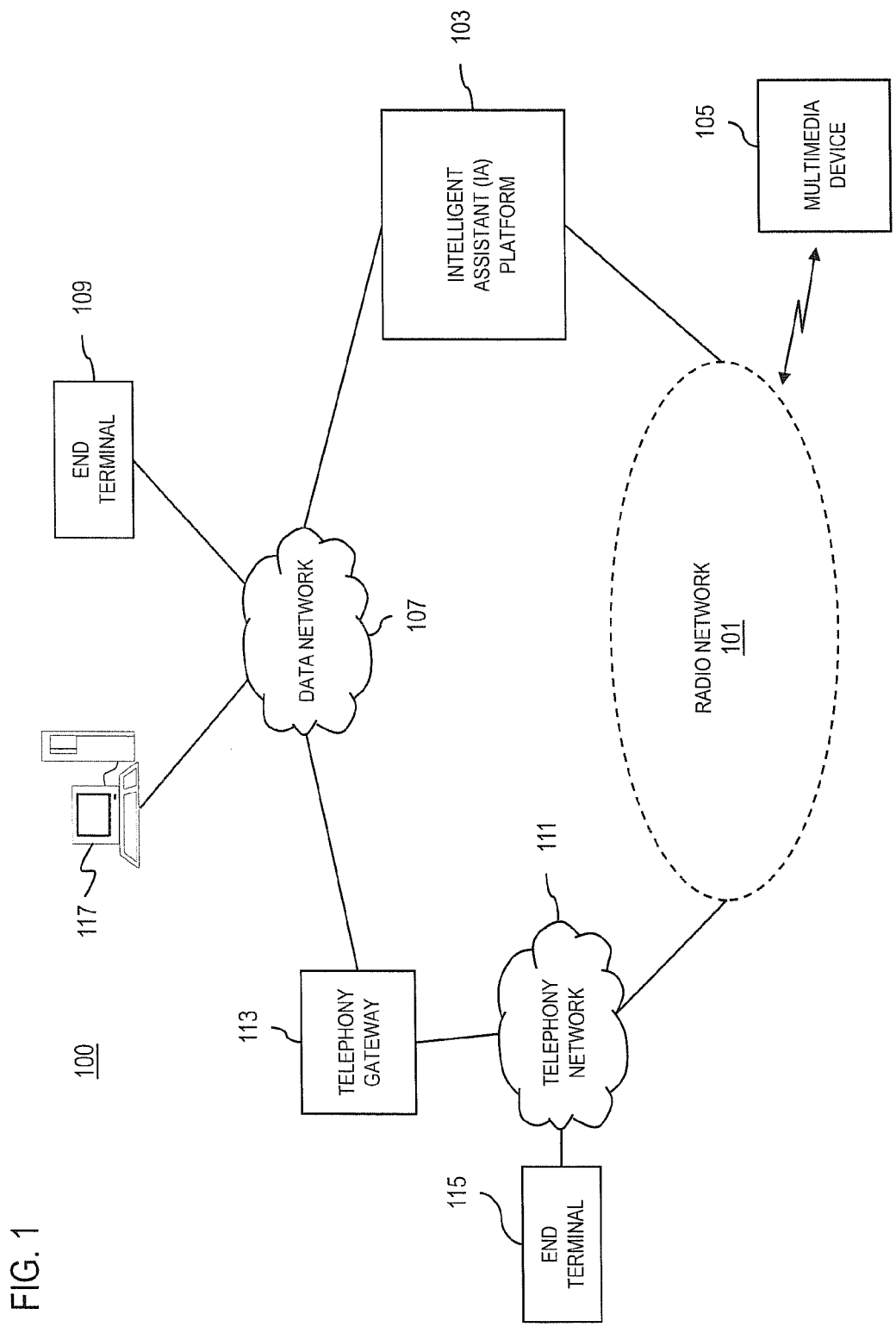
FIG. 1 is a diagram of a system capable of providing enhanced verbal communications using supplemental information and actions, according to an exemplary embodiment.

FIG. 1 is a diagram of a system capable of providing enhanced verbal communications using supplemental information and actions, according to an exemplary embodiment. For the purposes of illustration, a mechanism for enhancing verbal communications is described with respect to a communication system 100 that includes a radio network 101, such as a cellular network. It is contemplated that the network may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like.

The system 100 includes an Intelligent Assistant (IA) platform 103 that resides on the network for providing enhanced verbal communications using supplemental information and actions. In addition (or alternatively), the IA platform 103 may reside within customer premises equipment (CPE) (not shown). The IA platform 103 enables automated and seamless enhancement of a verbal communication session by providing information or performing actions that are relevant to the subjects discussed during the communication session. As discussed above, a party engaged in a verbal communication session (e.g., a telephone call) may not have the opportunity, resources, or ability to access online information resources to assist the party during the session. For example, if the party is engaged in a telephone call and is asked whether he or she is available for an appointment at a particular time, the party may need to consult an online calendar to determine availability. In some cases, it may be cumbersome or impractical for the party to immediately check the calendar and provide a response during the call. Consequently, there could be a delay before the party can definitively respond to the appointment request.

To address this problem, the IA platform 103 may use, for instance, voice recognition technology to convert the verbal component of a communication session to textual information. The platform 103 may then scan the textual information for specific words and/or phrases to trigger an application that provides information or performs an action to supplement the ongoing conversation. In exemplary embodiments, the platform 103 may privately provide the supplemental information or give feedback that an action has been performed to a party of the communication session. In this way, the platform 103 may act like an assistant who "whispers" or initiates text/video messages, for example, relevant information or who quietly performs tasks in the background to support the party during a conversation.

As seen in FIG. 1, the IA platform 103 is connected to a multimedia device 105 (e.g., mobile device, or handset) via a cellular gateway (not shown) over a radio network 101. The multimedia device 105 may, for instance, provide access to the services of the IA platform 103. The IA platform 103 also has connectivity to a data network 107 that supports an end terminal 109. The data network 107 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. The end terminal 109 may be any computing device (e.g., Personal Digital Assistant (PDA), personal computer, laptop, etc. (capable of providing access to the services of the IA platform 103 and supporting voice and multimedia communications (e.g., a Voice over Internet Protocol (VoIP) station). The data network 107 also may communicate with a telephony network 111 using a telephony gateway 113. In this example, the telephony network 111 can serve end terminal 115, which may provide access to the services of the IA platform 103 and include a voice station for initiating a voice call to other end terminals capable of supporting the voice call.

The data network 107 additionally permits a host 117 to access IA platform 103 functions and settings via a graphical user interface (GUI) such as a browser application or any web-based application for multimedia device 105, end terminal 109, and/or end terminal 115. Under one scenario, it is contemplated that a user can configure IA services, functions and settings for multimedia device 105, end terminal 109, and/or end terminal 115 using the host 117 via a web browser.

In one embodiment, the IA service is a managed service, whereby a service provider operates the platform 103 to serve one or more subscribers.

Figure 2:
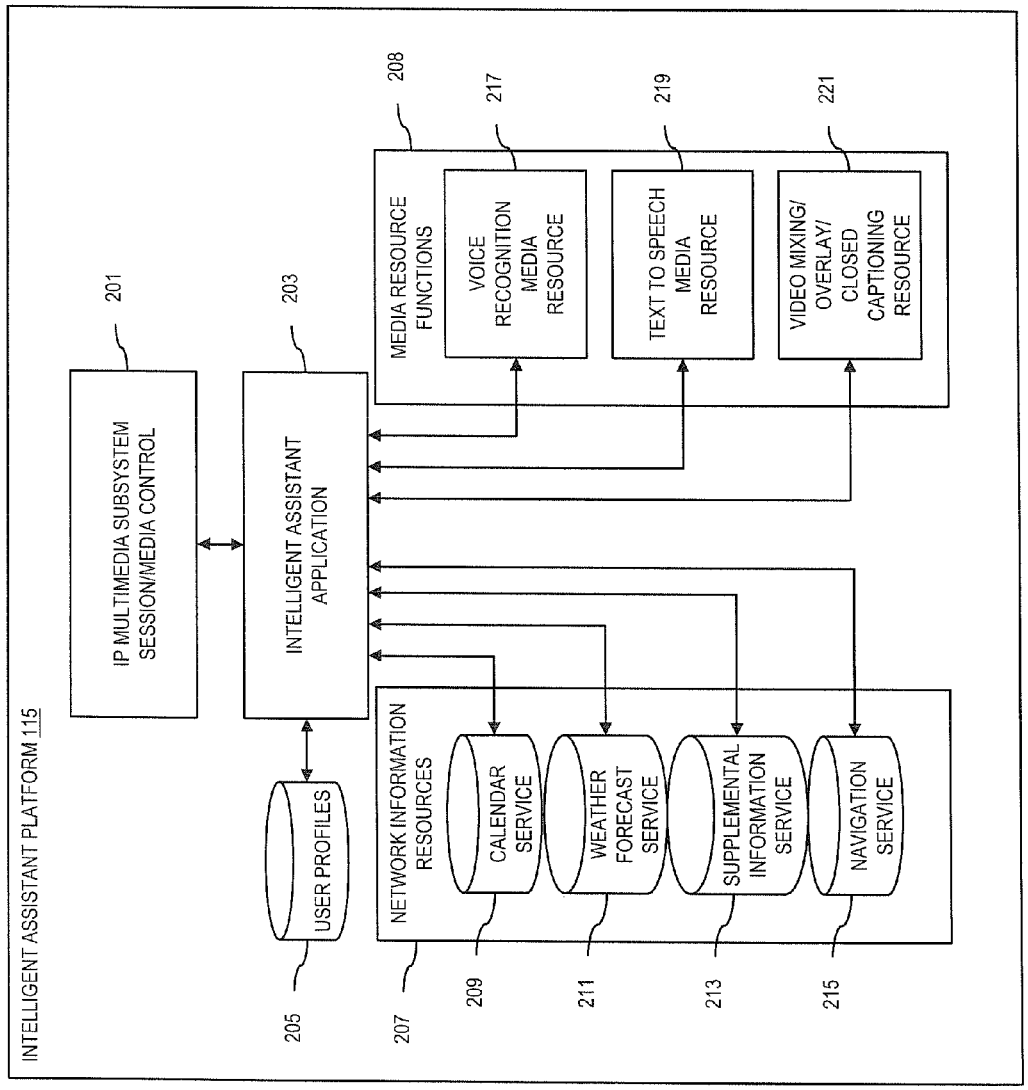
FIG. 2 is a diagram of the components of an Intelligent Assistant (IA) platform, according to an exemplary embodiment.

FIG. 2 is a diagram of the components of an IA platform, according to an exemplary embodiment. In this embodiment, the IA platform 103 includes an IP Multimedia Subsystem (IMS) session/media control platform 201 for providing the signaling and communication session controls to invoke the IA application 203. Specifically, the IMS session/media control platform 201 can detect the initiation of a communication session and direct the verbal component of the communication session to the IA application 203. In turn, the IA application 203, for instance, analyzes the verbal component of the communication session for words or phrases that trigger the application 203 to provide supplemental information or perform an action to support the communication session.

By way of example, the IA application 203 may have access to a database 205 of user profiles, network information resources 207, and media resource functions 208. The user profiles stored in user profile database 205 may include user settings and configuration information. Network information resources 207 may include a calendar service 209, weather forecast service 211, supplemental information service 213, and/or navigation service 215. Media resource functions 208 may include a voice recognition media resource 217, a text-to-speech media resource 219, and a video mixing/overlay/closed captioning resource 221.

The IA application 203 may access network information resources 207 to provide supplemental information or initiate actions based on the application's analysis of the nature of the communication session. For example, calendar service 209 within network information resources 207 may provide information on a party's past and scheduled events and support actions such as checking for a party's availability and committing to a calendar event. In addition, the calendar service 209 may provide general personal information management functions such as to-do lists and address books. In this case, the calendar service 209 may also support actions such as committing to tasks, adding contacts, and looking up contact information. The weather forecast service 211 can provide the current weather condition or forecast for a location referenced in the communication session.

The supplemental information service 213 can provide access to a broad range of information services such as stock reports, business information, and/or general news. In some embodiments, the supplemental information service 213 may support actions such as querying Internet search engines and other online databases, and updating database information. The supplemental information service 213 also may be used to search for contact information of an individual or a business, and then automatically establish a communication session between the party and the contact. The navigation service 215 can provide location-based information and obtain an address, map, and/or directions of a location referenced in the communication session. The navigation service 215 also can support actions such as storing directions or a location in the memory of the communication device for later retrieval, or transmitting the location to either and internal navigation application (not shown) or an external navigation device (not shown). It is contemplated that additional services may be added to the set of network information resources 207 available to the IA application 203.

The IA application 203 may use media resources functions 208 to analyze a communication session and interact with parties of the session. For example, the IA application 203 may use voice recognition media resource 217 to convert the verbal component of a communication session to a searchable text format. More specifically, the voice recognition media resource 217 is configured to convert spoken language (analog signal) into textual information (digital signal) by extracting meaning from the user's spoken utterances and producing semantic information in the form of text. The application 203 can then scan the converted textual information to identify words or phrases within the communication session that can trigger the application 203 to provide supplemental information or perform an action.

Both the text to speech media resource 219 and the video mixing/overlay/closed captioning resource 221 enable the IA application 203 to provide its output to the party in different formats. For example, the IA application 203 can use the text-to-speech media resource 219 to convert the output from the IA application 203 (e.g., text) to spoken language that is playable through the audio system of the party's communication device. Similarly, the video mixing/overlay/closed captioning resource 221 can present the application 203's output as a textual pop-up window or other form of text output on the display of the party's communication device. If the communication session is video-based (e.g., video communications or multimedia conferencing) or the communication device is video-capable, the resource 221 can insert the application 203's output directly into a video stream that is presented on the party's communication device as a video overlay or as closed captioning.

Figure 3:
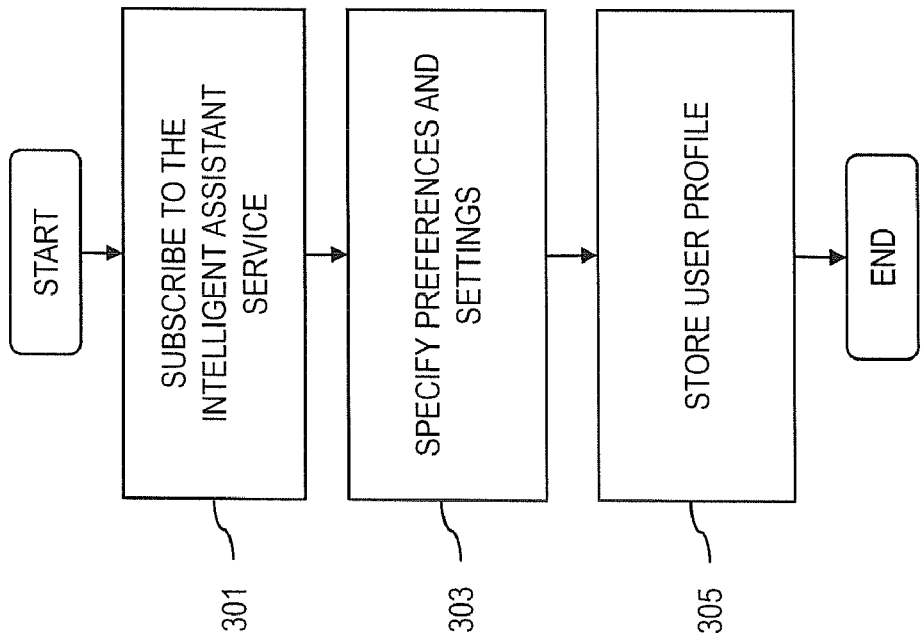
FIG. 3 is a flowchart of a process for initiating an IA service, according to an exemplary embodiment.

FIG. 3 is a flowchart of a process for initiating an IA service, according to an exemplary embodiment. In step 301, a user subscribes to the IA service; on subscription to the service, the IA platform 103 will begin enhancing verbal communication sessions by providing supplemental information and actions based on the content of the subscriber's communication session. During the setup process, the IA platform 103 can prompt the subscriber to create a user profile that contains information such as preferred information resources (e.g., a subscriber's calendar, online databases, and search engines), preferred application output format (e.g., audio overlay, haptic indicators, or video closed captioning), and device capability. Such parameters are specified by the subscriber, per step 303, as part of a service provisioning process, for example. The IA platform 103 completes the subscription setup process by storing the subscriber's user profile in the user profile database 205 (step 305). In exemplary embodiments, the subscriber can modify the stored profile information at any time, using any appropriate mechanism and device (e.g., multimedia device 105, end terminal 109, or end terminal 115). The preferences specified in the user profile database 205 direct how the IA platform 103 enhances the subscriber's verbal communication sessions.

Figure 4:
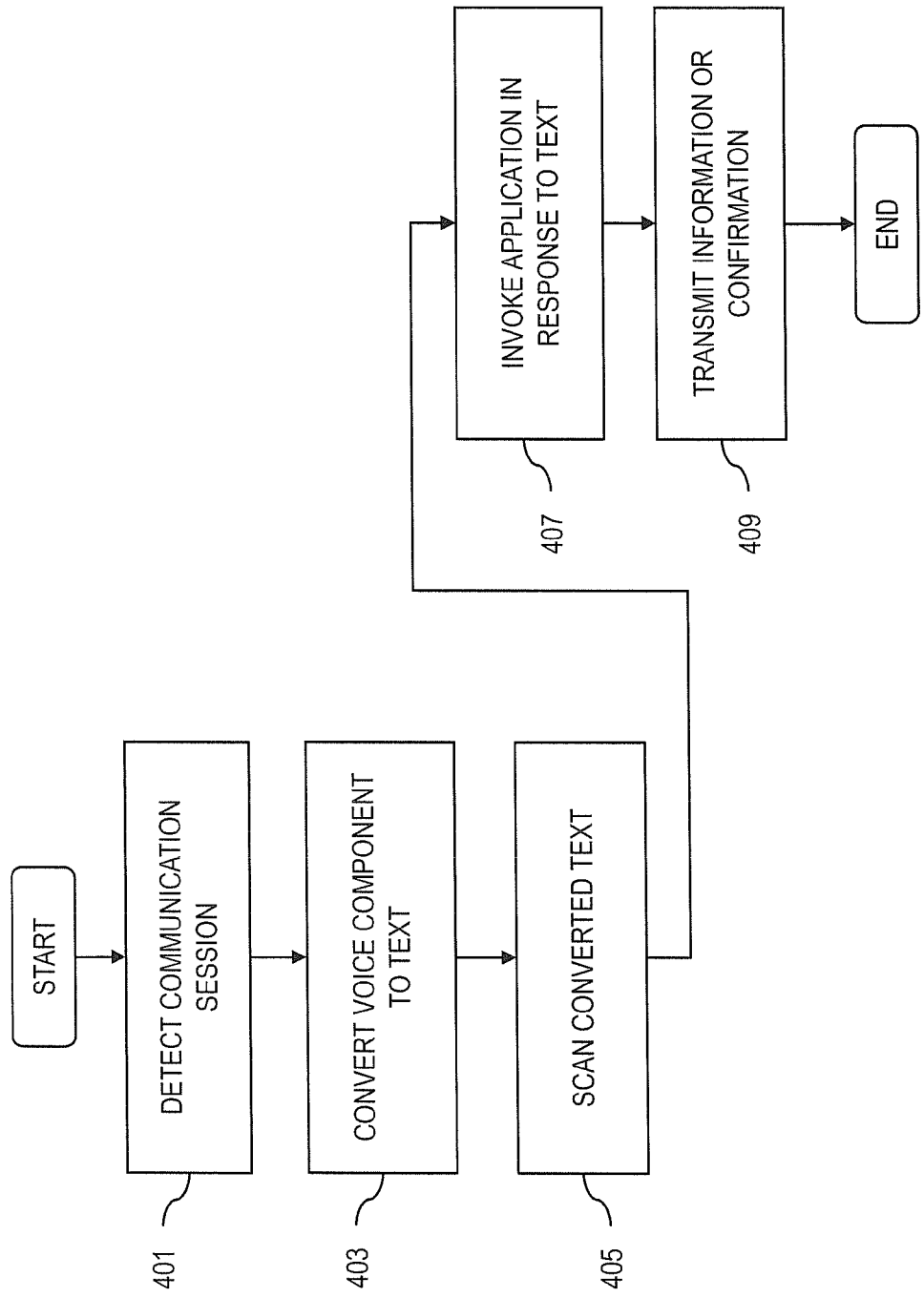
FIG. 4 is a flowchart of a process for providing enhanced verbal communications using supplemental information and actions, according to an exemplary embodiment.

FIG. 4 is a flowchart of a process for providing enhanced verbal communications using supplemental information and actions, according to an exemplary embodiment. In step 401, the IA platform 103 detects the initiation of a communication session between an IA service subscriber and one or more other parties. Such detection may be facilitated, for instance, by the IA platform's IMS session/media control platform 201. The detection also may be configured to occur either automatically by the IA platform 103 or manually at the subscriber's command (e.g., after the subscriber enters a key sequence). In certain embodiments, the configuration for the platform's mode of detection may be specified by the subscriber and stored in the user profile database 205. Additionally, the parties to the communication session may use a communication device such as multimedia device 105, end terminal 109, and/or end terminal 115 to initiate a communication session under the IA service. It is assumed that any type of authentication process can be employed to ensure the subscriber is authorized to use the IA service.

Following authentication (if any), the IMS session/media control platform 201 may direct the verbal component of the communication session to the IA application 203 within IA platform 103 for conversion to textual information (step 403). In one embodiment, the IA application 203 can use the voice recognition media resource 217 to convert spoken language into textual information in real-time. The conversion step enables the IA platform to translate the verbal component of the communication from an analog format (e.g., spoken language) into a digital format (e.g., textual information) to facilitate processing by the IA application 203. Once converted, the IA application 203 searches the textual information for specific text strings (e.g., words and/or phrases) that can trigger the application 203 to provide supplemental information or actions (step 405). It is contemplated that the text search may also include the use of algorithms, for example natural language understanding, that can determine the context of a text string based on, for example, the occurrence of the text string in relation to other recognized text in the converted textual information. Based on, for example, the nature of the word or phrase and the context in which it is used in the communication session, the IA application 203 can be invoked to access specific services within network information resources 207 to provide information or perform an action to supplement the conversation (step 407). As discussed previously, network information resources 207 may include a variety of services and databases covering a range of subjects (e.g., calendar, weather, business information) that may arise during a conversation. It is contemplated that the set of available network information resources 207 is extensible.

The IA platform 103 then transmits the supplemental information or confirmation of the action to the subscriber based on the preferences specified in the subscriber's user profile (step 409). In exemplary embodiments, the IA platform 103 can interact with the subscriber by transmitting the information as audio and/or visual "hints" in a variety of formats (e.g., audio overlay, pop-up text, video overlay, closed captioning, haptics, etc.). These "hints" are information or notices that can assist the subscriber in conducting his or her communication session. Moreover, the hint format can be dynamic in nature, whereby the occurrence or presence of an environmental condition (e.g., noisy streets, a place with poor visibility, etc.) can be considered in determining the most appropriate format (as more fully described below).

In addition, the IA platform 103 may transmit the hint to the subscriber privately, i.e., without the knowledge of any other party of the communication session. More specifically, the IA platform 103 can be configured to transmit hints so that only the subscriber can access them. For example, if the hint is in an audio format, the IA platform 103 can overlay the audio hint on the audio stream that is being sent to the subscriber's communication device; any other party would not hear this audio hint or know that the subscriber has received a hint. Similarly, if the hint is in a visual format (e.g., textual pop-up, video overlay, closed captioning), the IA platform 103 can transmit the hint only to the display of the subscriber's communication device. This "private" assistance enables the subscriber to take advantage of the IA service without disturbing or alerting other participants. The IA platform 103 will continue to monitor the conversation for additional words and/phrases and to assist the subscriber in conducting the communication session until the session ends.

The following are sample use cases of the IA platform 103 discussed with respect to process of FIG. 4 and with respect to FIGS. 5A-5F.

FIGS. 5A-5F, respectively, are diagrams illustrating scenarios for using an IA service to (1) check availability and update a calendar, (2) check availability and obtain a weather forecast, (3) obtain a stock quote, (4) obtain location information, (5) initiate another communication session, and (6) respond to a customer service inquiry, according to various embodiments. For these exemplary use cases, it is assumed that an IA service subscriber and a second party are engaged in a communications session that is being serviced by the IA platform 103. Initial steps of detecting a communication session, authenticating the subscriber, and initiating the IA platform 103 have already been completed.

Figure 5A:
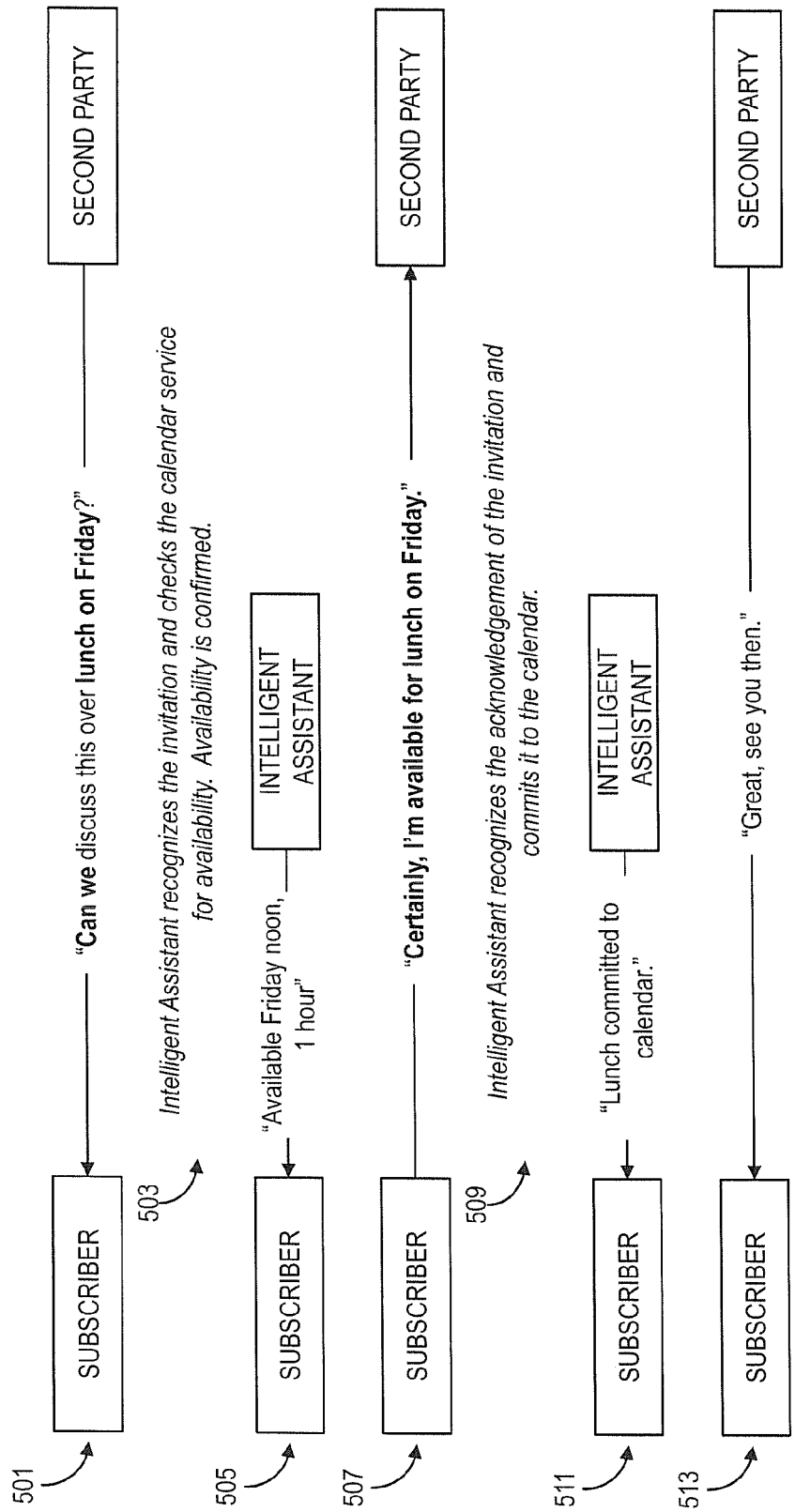

The first sample use case involves using the IA platform 103 to automatically check a subscriber's calendar for availability and commit an event to the subscriber's calendar. FIG. 5A is a diagram illustrating this example. In this case, the IA platform 103 monitors the conversation for key words or phrases that indicate the proposal of a calendar event (e.g., a proposal for a meeting) by converting the spoken words of the communication session to text and searching the converted text for words related to an event proposal. If an event proposal is detected, the IA platform 103 automatically checks the subscriber's availability via the calendar service 209, and informs the subscriber of his or her availability. If the subscriber accepts the proposal, the IA platform 103 automatically commits the event to the subscriber's calendar via calendar service 209. The IA platform 103 also can add information (e.g., event description, the names of the parties of the communication session) obtained during the communication session to the calendar entry in the calendar service 209. If configured, the IA platform 103 can also attach an audio clip or transcript of the portion of the conversation relating to the event.

In example 500 of FIG. 5A, a second party asks the subscriber, "Can we discuss this over lunch on Friday?" (step 501). The IA platform 103 recognizes the phrases "Can we" and "lunch on Friday" as indicative of a calendar proposal and immediately checks the subscriber's availability (step 503). In step 505, the IA platform 103 privately informs the subscriber via an audio hint that the subscriber is available. The subscriber then responds to the second party, "Certainly, I'm available for lunch on Friday" (step 507). The IA platform 103 recognizes the subscriber's response as an acceptance of the proposal, commits the event to the subscriber's calendar (step 509), and privately confirms the calendar entry to the subscriber (step 511). The second party responds, "Great, see you then," and ends the communication session (step 513).

Figure 5B:
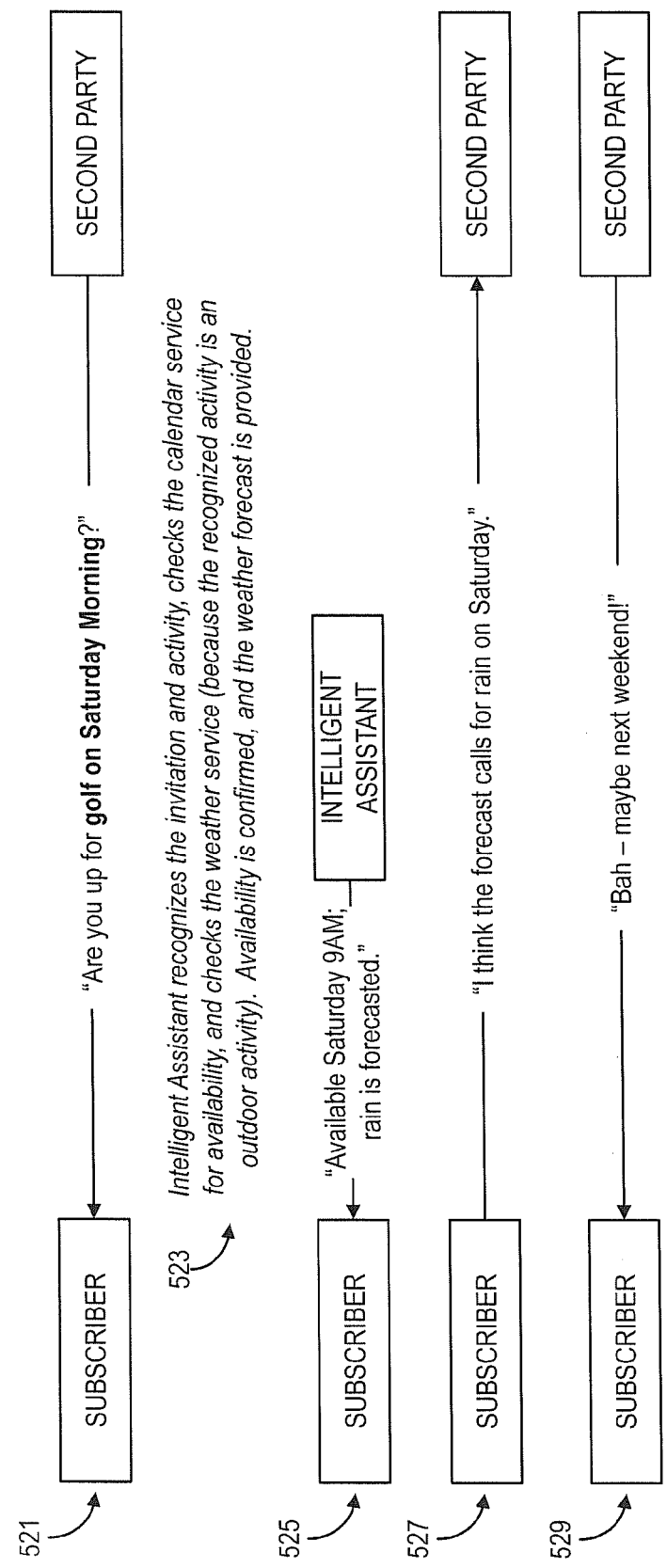

The second sample use case involves using the IA platform 103 to check calendar availability in conjunction with checking a weather forecast. FIG. 5B is a diagram illustrating this example. In this case, the IA platform 103 monitors the conversation for key words or phrases that indicate the proposal of a weather-dependent event (e.g., an outdoor activity). If a proposal for a weather-dependent event is detected, the IA platform 103 checks the subscriber's availability, checks the weather forecast for the proposed event time using the weather forecast service 211, and informs the subscriber of his or her availability and the weather forecast.

In example 520 of FIG. 5B, a second party asks the subscriber, "Are you up for golf on Saturday morning?" (step 521). The IA platform 103 recognizes the phrase "golf on Saturday morning" as indicative of a proposal of a weather-dependent event (i.e., golf) and immediately checks the subscriber's availability and the weather forecast at the proposed time (step 523). The IA platform 103 then informs the subscriber via an audio hint that the subscriber is available, but that rain is forecasted for Saturday (step 525). Accordingly, the subscriber responds to the second party that "I think the forecast calls for rain on Saturday" (step 527) and declines the invitation. In response, the second party replies "Bah— maybe next weekend" and ends the communication session (step 529).

Figure 5C:
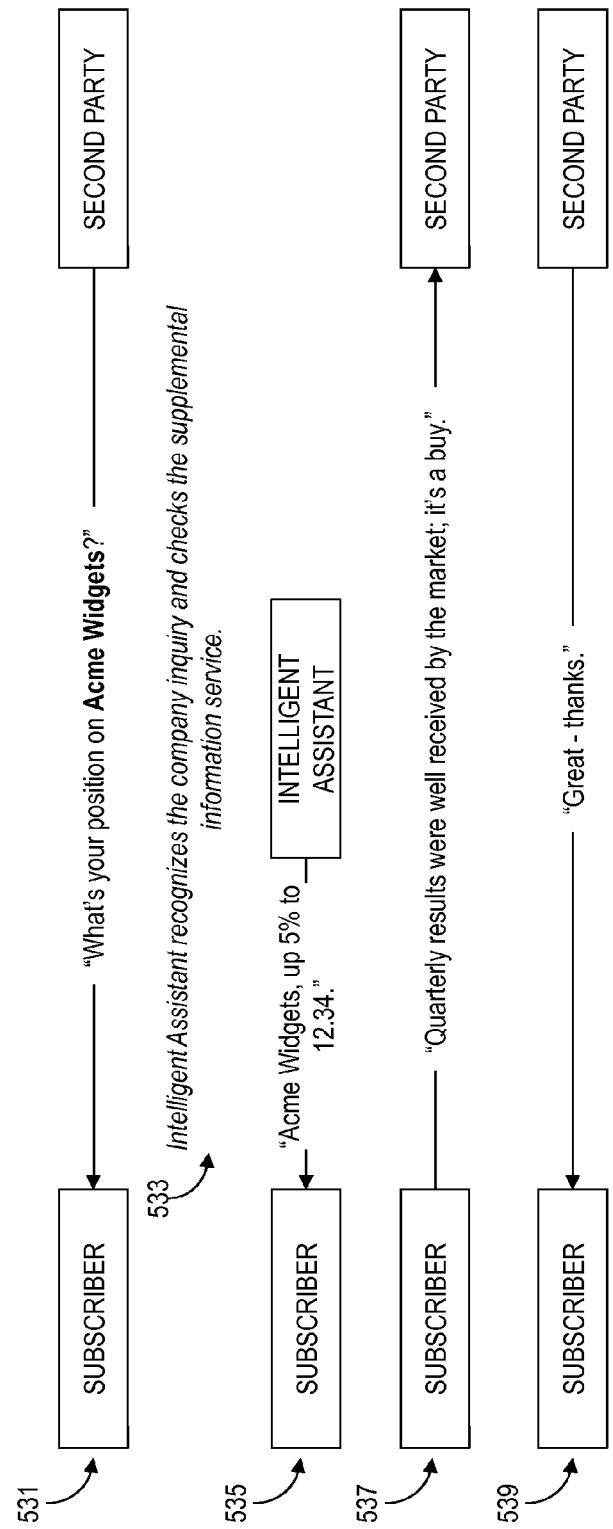

The third sample use case involves using the IA platform 103 to query information resources. FIG. 5C is a diagram illustrating this example. In this case, the IA platform 103 monitors the conversation for key words or phrases associated with a specialized field (e.g., stock trading). Once a query for specialized information is detected, the IA platform 103 can perform the query and inform the subscriber of the results.

In example 530 of FIG. 5C, a second party asks the subscriber, "What's your position on Acme Widgets?" (step 531). The IA platform 103 recognizes the phrase "position on Acme Widgets" as a request for a stock quote and queries the supplemental information service 213 for the information (step 533). The IA platform 103 then informs the subscriber via a textual pop-up window on the subscriber's multimedia device 105 that "Acme Widgets, up 5% to 12.34" (step 535).

The subscriber considers this information and responds to the second party that "Quarterly results were well received by the market; it's a buy" (step 537). The second party thanks the subscriber and ends the communication session (step 539).

The fourth sample use case involves using the IA platform 103 to obtain location-based information. FIG. 5D is a diagram illustrating this example. In this case, the IA platform 103 monitors the conversation for key words or phrases associated with a location name or address. Once detected, the IA platform 103 can provide the address, map, directions, and/or other location-based information to the subscriber.

In example 540 of FIG. 5D, a second party informs the subscriber that "The meeting has been changed to the American Hotel on First Street" (step 541). The IA platform 103 recognizes "the American Hotel on First Street" as a location, uses navigation service 215 to obtain the address and a map of the location, and displays the location and map on the subscribers multimedia device 105 (step 543). The IA platform 103 also informs the subscriber via an audio hint that "American Hotel, 144 First Street—Location displayed" (step 545). The subscriber then responds to the second party that "I know where that is, I'll be there" (step 547). The IA platform 103 has been continuing to monitor the conversation and recognizes the phrase "I'll be there" as confirmation that the subscriber intends to go to that location. Accordingly, the platform 103 uses the navigation service 215 to obtain directions from the subscriber's current location to the location of interest and stores the directions on the subscriber's multimedia device 105 (steps 549 and 551). The second party acknowledges the subscriber's reply and ends the communication session (step 553).

The fifth sample use case involves using the IA platform 103 to check subscriber availability for an event that requires an action on the part of the subscriber to setup or reserve (e.g., obtain tickets to a sporting event or make dinner reservations). FIG. 5E is a diagram illustrating this example. In this case, the IA platform 103 monitors the conversation for key words or phrases indicating a proposal of an event that may require additional action to setup or confirm. Once it detects a word or phrase indicative of such an event, the IA platform 103 can check the subscriber's availability via calendar service 209 and then originate a second communication session to the resource necessary to confirm the event. The IA platform 103 may be configured to originate the session during the initial communication session or at the end of the initial communication session. The IA platform 103 also may be configured to include only the subscriber or one or more parties in the second communication session.

In example 560 of FIG. 5E, a second party asks the subscriber, "Do you think we can get tickets to see the Red Sox on Saturday?" (step 561). The IA platform 103 recognizes the phrase "get tickets to see the Red Sox on Saturday" as a proposal for an event that requires obtaining tickets. The platform 103 then checks the subscriber's availability via calendar service 209 and checks the availability of game tickets via supplemental information service 213 (step 563). In step 565, the IA platform 103 informs the subscriber via audio overlay that tickets to the game are available. The subscriber responds to the second party that "We can do that. I'll get tickets. I'll let you know. Bye." (step 567). The IA platform 103 recognizes the phrase "I'll get tickets" as the subscriber's command to originate a communication session to the Red Sox ticket office and connects the subscriber to the ticket office to purchase the tickets (step 569). To complete the interaction, the IA platform 103 informs the subscriber via audio overlay that the platform is connecting the subscriber to the ticket office (step 571).

The sixth sample use case involves using the IA platform 103 to access information to assist in responding to a customer service inquiry. FIG. 5F is a diagram illustrating this example. In this case, the subscriber is a retail organization with customer service responsibilities engaged in conversation with a customer (i.e., the second party). For this example, it is also assumed that the customer service organization has added its own proprietary order tracking database to the list of available network information resources 207. The IA platform 103 monitors the conversation for key words or phrases indicating an inquiry regarding a customer service related issue or problem. Once it detects a word or phrase indicative of such an inquiry, the IA platform 103 can query the subscriber's proprietary database or perform an action to respond to the request.

In example 580 of FIG. 5F, a customer asks the subscriber's customer representative, "Can you please give me the status of Order #45673?" (step 581). The IA platform 103 recognizes the phrase "status of Order #45673" as a customer service related inquiry and queries the subscriber's proprietary database (step 583). In step 585, the IA platform 103 informs the customer service representative via audio overlay that the customer's order is at the warehouse awaiting shipping. The representative responds to the customer that "The order is currently being processed at our warehouse and will ship shortly. I will send you the tracking information when the order ships. Is there anything else I can help you with?" (step 587). The IA platform 103 recognizes the phrase "I will send you the tracking information when the order ships" as a follow-up task, commits the task to the customer service representative's to-do list (step 589), and informs representative via audio overlay that the task has been added (step 591). The customer responds "No, you've been helpful. Thanks." and ends the call (step 593).

Figure 6:
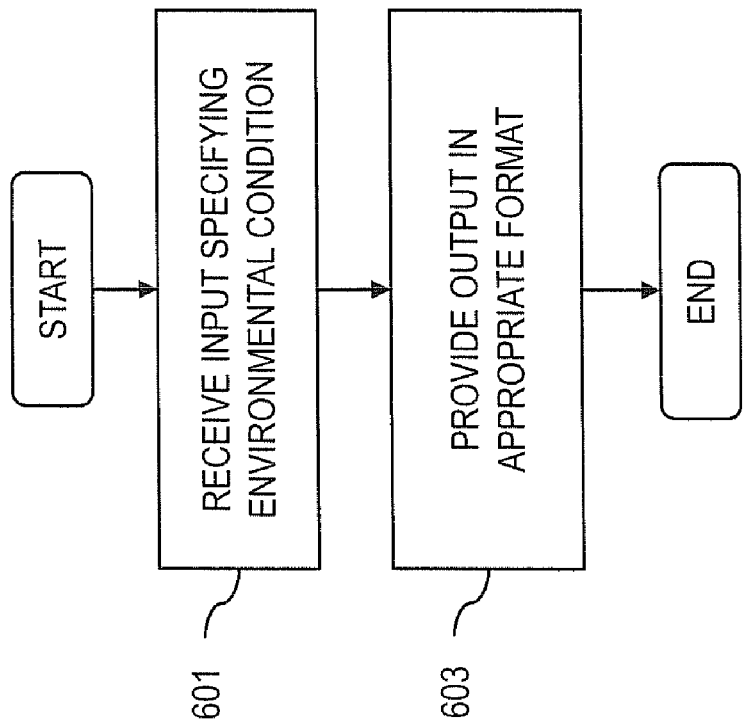
FIG. 6 is a flowchart of a process for providing enhanced verbal communications based on environmental conditions, according to an exemplary embodiment.

FIG. 6 is a flowchart of a process for providing enhanced verbal communications based on an environmental condition, according to an exemplary embodiment. In exemplary embodiments, a subscriber to the IA service may at any point (e.g., before a communication session begins or during a communication session) specify an environmental condition (e.g., noisy environment, attendance at a meeting, driving, etc.) that can direct the IA platform 103 to provide its output (e.g., information and communication hints) in a specific format. In other words, the subscriber may indicate that he or she is in an environmental condition that restricts the type of communication the user can receive, for example via the subscribers presence status (e.g., "in a meeting"). The subscriber may make this specification input through, for instance, a multimedia device 105, end terminal 109, or end terminal 115. The IA platform 103 receives the subscriber's input specifying an environmental condition (step 601) and can use this input to direct the application's output format. In step 603, the IA platform 103 transmits any supplemental information or confirmation of an action to the subscriber in a format appropriate for the specified environmental condition. For example, if the subscriber is in an environment where use of a display may be restricted (e.g., driving), the IA platform 103 can provide its output in an audio format such as an audio overlay on the communication session. If the subscriber is in an environment where audio may not be appropriate (e.g., a meeting or a noisy environment), the IA platform 103 can provide its output in a haptic or visual format (e.g., textual pop-up, video overlay, closed captioning).

Figure 7:
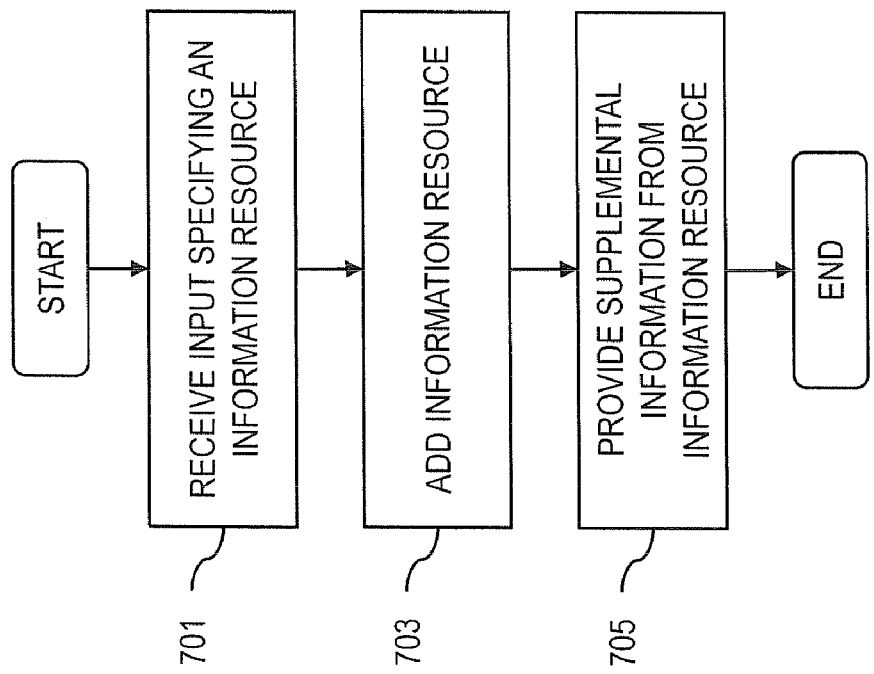
FIG. 7 is a flowchart of a process for adding an information resource to the IA platform, according to an exemplary embodiment.

FIG. 7 is a flowchart of a process for adding an information resource to the IA platform, according to an exemplary embodiment. As discussed above, it is contemplated that the set of available network information resources 207 is extensible. The IA platform 103 enables this functionality by, for instance, receiving an input from a subscriber specifying an additional information resource (step 701). This additional information resource may include any information database or service not previously included within network information resources 207 (e.g., a new database of technical journals, a company's internal database, etc.) The IA platform 103 then may add this information resource to the list of available network information resources 207 (step 703). In certain embodiments, the subscriber may specify whether or not to make the additional information resource available to other subscribers. The user also may specify what key words or phrases can trigger use of the additional information resource. The IA platform 103 can, for instance, store this configuration information in the user profile database 205. Once the information resource is added, the IA platform 103 will begin providing supplemental information from that information resource as appropriate in the subscriber's subsequent communication sessions (step 705).

Figure 8:
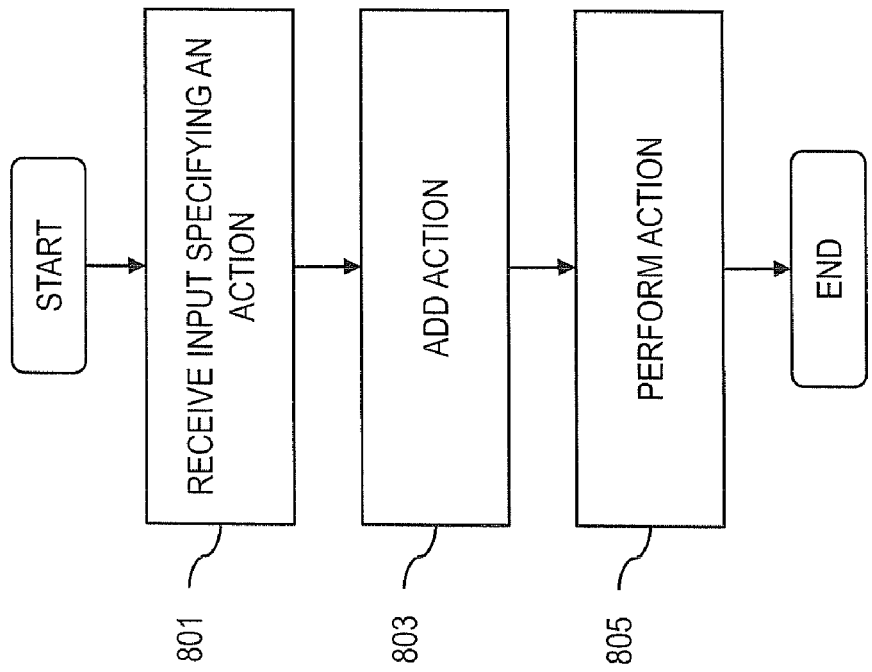
FIG. 8 is a flowchart of a process for adding an action to the IA platform, according to an exemplary embodiment.

FIG. 8 is a flowchart of a process for adding an action to the IA platform, according to an exemplary embodiment. Similar to the process described above with respect to FIG. 8, the IA platform 103 enables a subscriber to add specific actions to the list of available actions contained within network information resources 207. In step 801, the IA platform 103 receives an input from a subscriber specifying a new action (step 803). For example, a subscriber may add an action that will automatically forward copies of new calendar events to the subscriber's secretary. The user may also specify the key words or phrases that can be used to trigger the action. The IA platform 103 can then store the action and configuration information in the user profile database 205 and add the action to the list of actions available to the platform 103. Once the action is added, the IA platform 103 can monitor the subscriber's subsequent communications sessions and perform the action as appropriate (step 805).

The processes described herein for enhancing verbal communication sessions may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
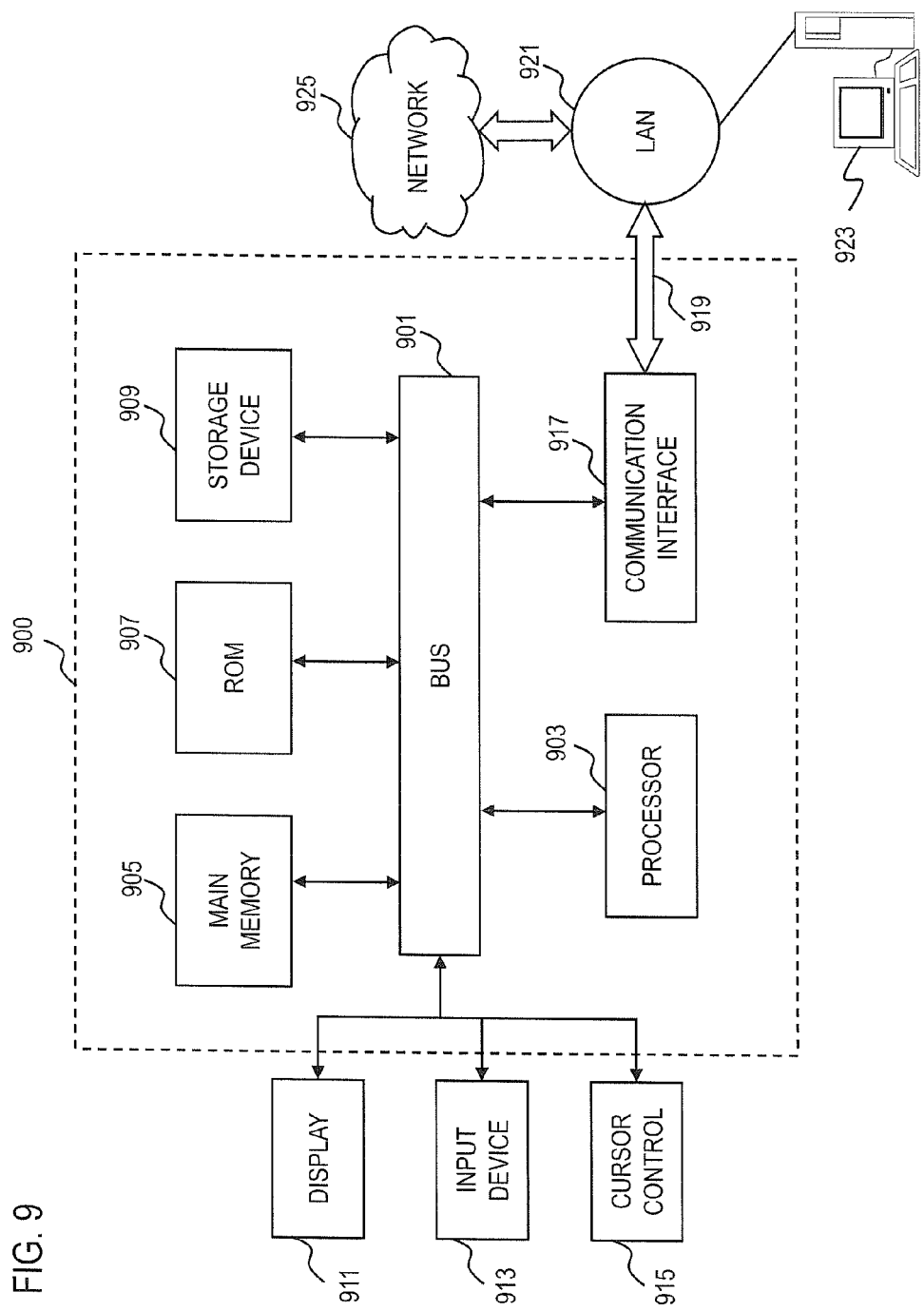
FIG. 9 is a diagram of a computer system that can be used to implement various exemplary embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    converting a verbal component of a communication session into textual information;
    scanning the converted textual information for a text string to trigger an application;
    invoking the application to perform an action in response to the textual information, for or on behalf of a party of the communication session, to provide supplemental information about the textual information; and
    transmitting the supplemental information or a confirmation of the action to the party.

2. A method of claim 1, wherein the application transmits the supplemental information or performs the action for or on behalf of the party without the knowledge of another party of the session.

3. A method of claim 1, wherein the transmitted supplemental information or confirmation includes an audio clip or transcript of the point in the communication that triggered the application.

4. A method of claim 1, wherein the supplemental information is provided from one or more network information resources or services including:
 a calendar service;
 a weather forecast service;
 a business information service; and
 a navigation service.

5. A method of claim 1, wherein the action performed includes:
 checking calendar availability;
 committing to a calendar event;
 committing to a task;
 adding contacts;
 looking up contact information;
 providing a weather forecast;
 retrieving business information;
 obtaining an address, map, or directions; and
 establishing a communication session with a party who is not currently a session participant.

6. A method of claim 1, wherein the supplemental information or the confirmation of the action is transmitted as an audio hint, haptic hint, or a visual hint.

7. A method of claim 6, wherein the audio hint is a text-to-speech overlay on the communication session, and the visual hint is a textual pop-up, video overlay, closed captioning, or any combination thereof.

8. A method of claim 1, further comprising:
 receiving input, from the party, specifying an environmental condition; and
 providing the information or feedback of an action in an audio hint, haptic hint, or visual hint format corresponding to the environmental condition.

9. A method of claim 1, further comprising:
 receiving input, from the party, specifying an information resource;
 adding the information resource to a list of available information resources; and
 providing supplemental information from the additional information resource based on the converted textual information.

10. A method of claim 1, further comprising:
 receiving input, from the party, specifying an action;
 adding the action to a list of available actions; and
 performing the action based on the converted textual information.

11. An apparatus comprising:
 a processor configured to convert a verbal component of a communication session into textual information, and to scan the converted textual information for a text string to trigger an application,
 wherein the processor is further configured to invoke the application to perform an action in response to the textual information, for or on behalf of a party of the communication session, to provide supplemental information about the textual information,
 wherein the supplemental information or a confirmation of the action is transmitted to the party.

12. An apparatus of claim 11, wherein the application transmits the supplemental information or performs the action for or on behalf of the party without the knowledge of another party of the session.

13. An apparatus of claim 11, wherein the transmitted supplemental information or confirmation includes an audio clip or transcript of the point in the communication that triggered the application.

14. An apparatus of claim 11, wherein the supplemental information is provided from one or more network information resources or services including:
 a calendar service;
 a weather forecast service;
 a business information service; and
 a navigation service.

15. An apparatus of claim 11, wherein the action performed includes:
 checking calendar availability;
 committing to a calendar event;
 committing to a task;
 adding contacts;
 looking up contact information;
 providing a weather forecast;
 retrieving business information;
 obtaining an address, map, or directions; and
 establishing a communication session with a party who is not currently a session participant.

16. An apparatus of claim 11, wherein the supplemental information or the confirmation of the action is transmitted as an audio hint, haptic hint, or a visual hint.

17. An apparatus of claim 16, wherein the audio hint is a text-to-speech overlay on the communication session, and the visual hint is a textual pop-up, video overlay, closed captioning, or any combination thereof.

18. An apparatus of claim 11, further comprising:
 a communication interface configured to receive input, from the party, specifying an environmental condition,
 wherein the information or feedback of an action is provided in an audio hint, haptic hint, or visual hint format corresponding to the environmental condition.

19. An apparatus of claim 11, further comprising:
 a communication interface configured to receive input, from the party, specifying an information resource, to add the information resource to a list of available information resources, and to provide supplemental information from the additional information resource based on the converted textual information.

20. An apparatus of claim 11, further comprising:
 a communication interface configured to receive input, from the party, specifying an action, to add the action to a list of available actions, and to perform the action based on the converted textual information.

21. A non-transitory computer-readable storage medium carrying one or more sequences of one or more instructions which, when executed by one or more processors, cause an apparatus to at least perform:
 convert a verbal component of a communication session into textual information,
 scan the converted textual information for a string to trigger an application,
 invoke the application to perform an action in response to the textual information, for or on behalf of a party of the communication session, to provide supplemental information about the textual information, and
 transmit the supplemental information a party of the communication session.

22. A non-transitory computer-readable storage medium according to claim 21, wherein the apparatus is further caused, at least in part, to perform:
  receive input, from the party, specifying an environmental condition, and
  provide the supplemental information in a format suitable for the environmental condition.

* * * * *